April 8, 1941.                J. J. TOKHEIM                 2,237,462
                      LIQUID LEVEL GAUGE EQUIPMENT
                      Filed Dec. 2, 1937        2 Sheets-Sheet 1
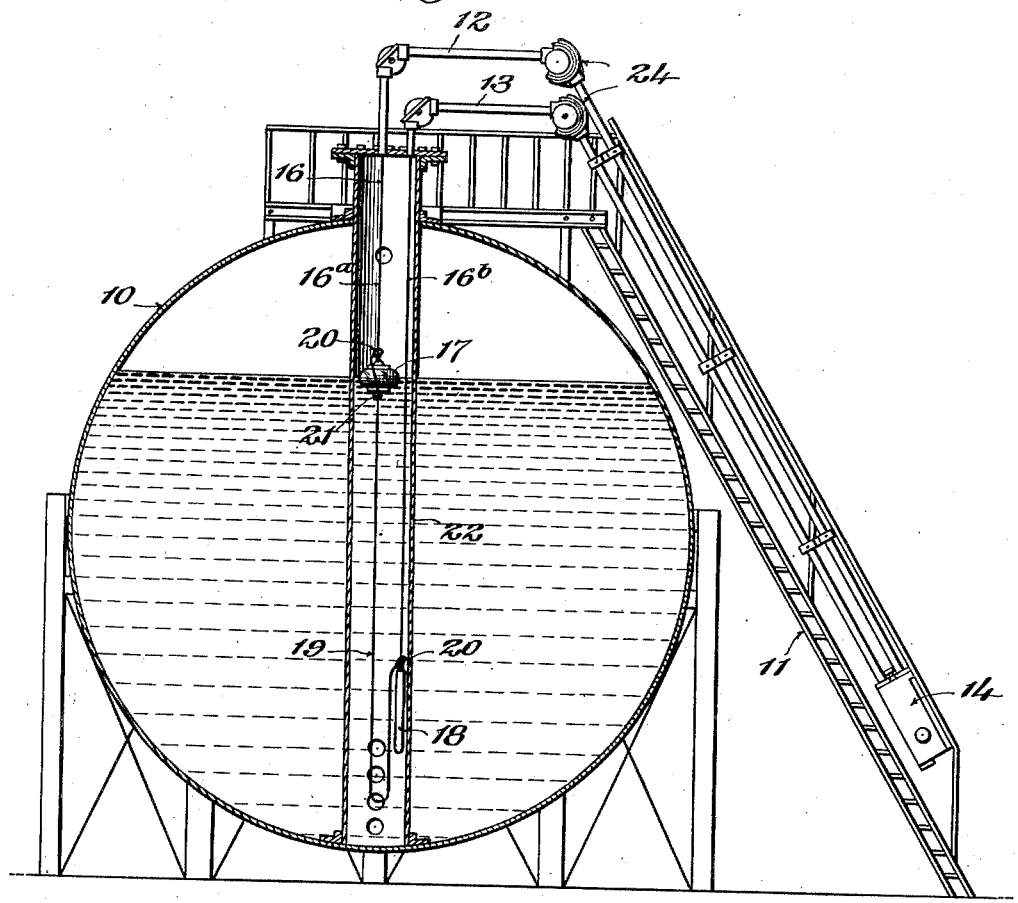
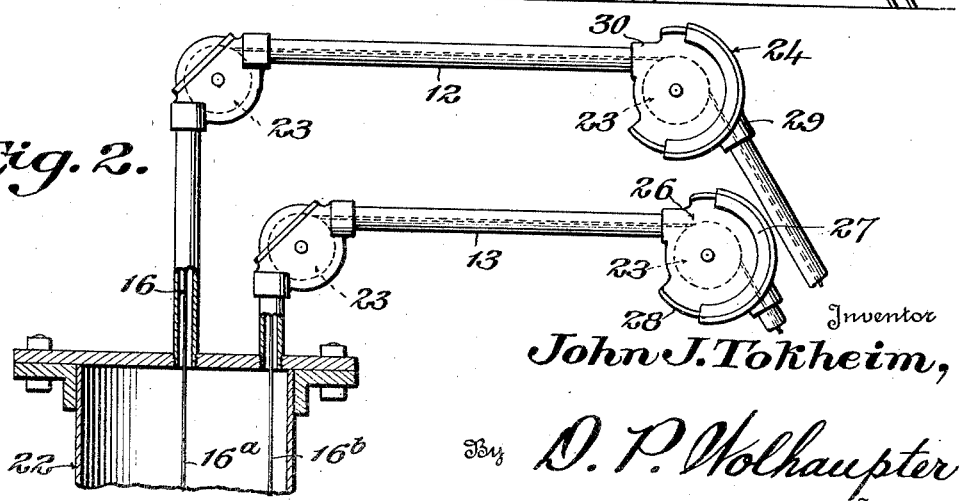
Inventor
John J. Tokheim,
By D. P. Wolhaupter
Attorney

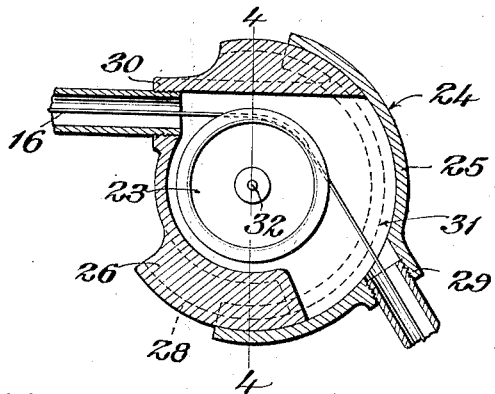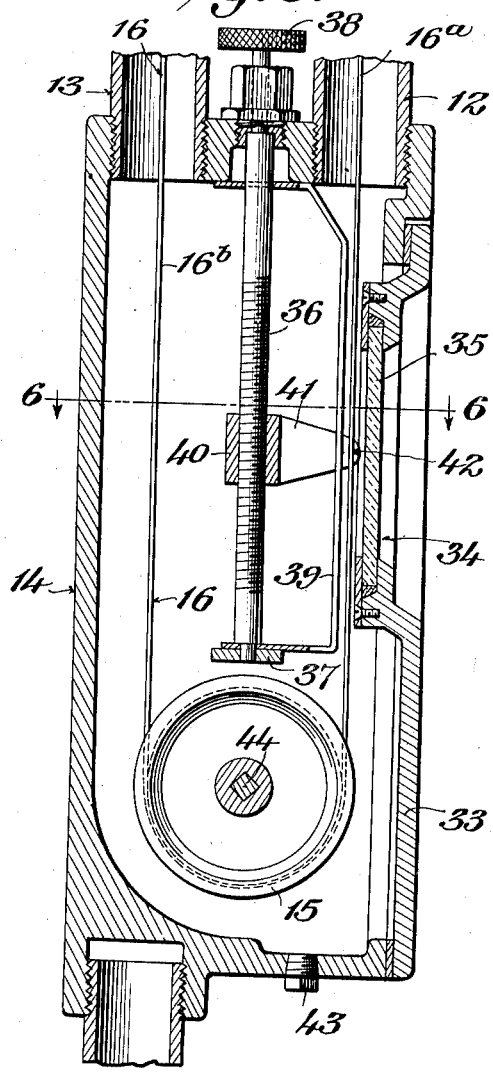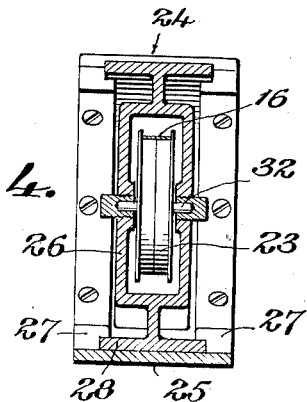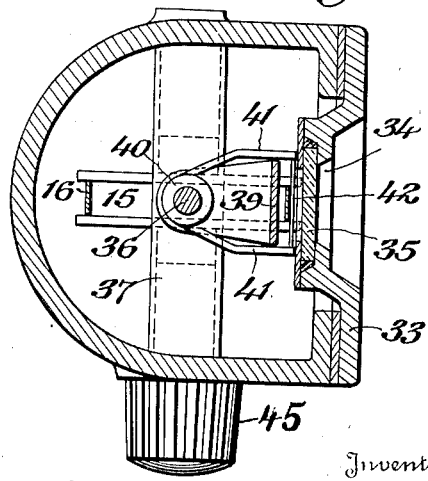

Patented Apr. 8, 1941

2,237,462

UNITED STATES PATENT OFFICE 2,237,462

LIQUID LEVEL GAUGE EQUIPMENT

John J. Tokheim, Cedar Rapids, Iowa

Application December 2, 1937, Serial No. 177,794

2 Claims. (Cl. 73—321)

This invention relates to float operated liquid level gauges, and has particular reference to an improved float operated liquid level gauge which, while capable of general use, is particularly designed for use in connection with storage tanks for volatile liquids, such as gasoline.

The present float operated gauge is of the type including a tape which is attached to the float for movement in harmony with the latter and which bears liquid level indications thereon for cooperation with an index, the weight of the float being utilized to move the tape in one direction when the level of the liquid falls, and a counterweight attached to the tape being utilized to move the tape in the opposite direction when the level of the liquid rises. In order that a gauge of this type may operate smoothly and properly it is necessary that the counterweight be freely movable vertically and that it shall have a permissible range of vertical movement at least equal to the range of vertical movement of the float. However, to provide for such movement of the counterweight in installations of prior types of gauges has not always been practicable, and in many instances has involved serious complications. Accordingly, another important object of the present invention is to provide a float operated liquid level gauge of the tape and counterweight type embodying a construction whereby the counterweight may be disposed within the tank with which the gauge is associated where it will be freely movable and have the required range of movement regardless of conditions exteriorly of the tank.

With the foregoing and other objects in view, which will become more fully apparent as the nature of the invention is better understood, the same consists in the novel features of combination, construction and arrangement as will be hereinafter more fully described, illustrated in the accompanying drawings and defined in the appended claims.

In the accompanying drawings, wherein like characters of reference denote corresponding parts in the different views:

Figure 1 is a vertical sectional view through a liquid storage tank illustrating the association therewith of a liquid level gauging equipment embodying the features of the invention.

Figure 2 is an enlarged elevation of portions of the tape enclosing tubes or conduits of the equipment.

Figure 3 is a longitudinal section through one of the adjustable fittings for connecting together adjacent sections of the tape accommodating tubes.

Figure 4 is a cross section on the line 4—4 of Figure 3.

Figure 5 is an enlarged vertical sectional view through the index housing of the equipment; and Figure 6 is a cross section on the line 6—6 of Figure 5.

Referring to the drawings in detail, 10 designates a liquid storage tank which may be of any size, shape and design and which may be mounted in any known manner, either below, or at, or above the ground surface, the same being illustrated in the present instance as being supported above the ground surface and as having a ladder 11 leading to the top thereof in accordance with known practice and for a known purpose.

Connected in any suitable manner with the tank 10 in vapor tight relationship thereto and leading from the top thereof to any desired location, are two tubes 12 and 13 which, at their ends remote from the tank, are connected with one end of an index housing 14 the other end of which is closed. In the housing 14 is a sheave 15, and extending over this sheave is the intermediate portion of a tape 16 the respective reaches 16$^a$ and 16$^b$ of which extend through the tubes 12 and 13 into the tank 10 where one of said reaches, the reach 16$^a$ in the present instance, is connected to the top of a float 17, and the other of said reaches, the reach 16$^b$ in the present instance, has connected thereto a weight 18. This weight is lighter than the float 17. It will be observed from Fig. 1 that the weight 18 is preferably of elongated rod-like form. Therefore, said tape is movable in one direction by the weight of the float 17 when the latter moves downwardly upon fall of the level of the liquid in the tank and is movable in an opposite direction by the weight 18 when the float rises responsive to rise in the level of the liquid in the tank. Since the weight 18 is disposed within the tank, installation of the gauging equipment obviously is simplified at least to the extent that any necessity of the provision of special means outside of the tank to accommodate said weight is avoided.

To neutralize the effect of the weight of the tape 16 upon the float 17 in different positions of the latter so that the gauge will read accurately at all times, a section 19 of flexible material, of the same weight per unit of length as the tape 16, is engaged at its ends with the ends of said tape and renders the latter, in effect, endless. Thus, so far as the weight of the tape is concerned, its effect upon the float 17 is neutralized regardless of the position of the float in the tank. The section 19 may consist of the same material as the tape 16 or it may be comprised by any other material. In either case, said section 19 preferably is provided at its ends with eyes 20 which slidably engage the reaches 16a, 16b of the tape 16 above the float 17 and above the weight 18, respectively, so that when said weight is disposed adjacent to the bottom of the tank 10, any tendency of the section 19 to support the weight 18 as a result of contact of the weight with the bottom of the tank results simply in one of the eyes 20 moving upwardly along the related reach of the tape 16 so that tendency of the section 19 to attempt to support the weight is overcome and does not affect the accuracy of the gauge. The float 17 may or may not be provided at its bottom with a guide loop or eye 21 for the section 19, as may be desired. Under ordinary operation of the tank the tape will not rest on the bottom but if the tank be filled above its proper upper limit the weight 18 will hit the bottom of the tank and tilt until the top end of the weight drops below the lower end of the member 19 which, at the time, hangs nearly vertical and in a straight line. Without the provision of the loop 20 at the top of the weight 18 a somewhat further filling of the tank permits the lower loop 20 to slide up the tape section 16b without any of the weight of the member 18 being carried by the float 17 as would be the case were the member 19 fixed to the weight 18. Furthermore the provision of the loops 20 permits the member 19 to be connected to the tape proper without interfering with proper connection of the weight 18 and float 17 to said tape.

In the present instance the tubes 12 and 13 are shown as being connected to the top of a gauging well 22 disposed within the tank 10 and shielding the float 17, as and for the purposes set forth in my companion application, Serial No. 177,793, filed of even date herewith. However, so far as the mechanism comprising the present invention is concerned, the use of a gauging well such as the well 22 is optional and if it is not used the tubes 12 and 13 may be connected with the tank either directly or in any other suitable manner.

Wherever different portions of the tubes 12 and 13 extend in different directions there preferably are provided within said tubes at the junctions of the different portions thereof, or within the fittings connecting the different portions thereof, suitable sheaves or rollers 23 over which the tape 16 is guided for free travel. Other sheaves or rollers may be provided in straight portions of said tubes if desired to further assist in providing for free travel of the tape 16. Moreover, angularly adjustable fittings 24 are, or may be, employed to connect different portions of the tubes 12 and 13 so that certain portions of said tubes may be disposed at various different angles relative to other portions of said tubes. Thus, any necessity of providing a special fitting for each different angular installation of different portions of the tubes 12 and 13 is avoided. This is important because of the wide variance in angular relationship between different portions of the tubes 12 and 13 required in different installations. For example, it may be desired to mount the index housing 14 and portions of the tubes 12 and 13 at the side of a ladder 11, as shown in Figure 1 of the drawings. Different ladders may be disposed at different inclinations, but by the use of angularly adjustable fittings such as the fittings 24, different portions of the tubes 12 and 13 may be disposed in the desired angular relationship relative to each other to permit the installation, it being simply required to cut the tube sections of the proper length in accordance with particular installation conditions in any given instance.

One of the fittings 24 is illustrated in Figures 3 and 4 of the drawings as comprising a segmental casing 25 and a hollow head 26 rotatably fitted within said casing and retained therein by flanged members 27 fastened to said casing and engaging flanges 28 on said head, the casing 25 being formed, as indicated at 29, to have one pipe or tube section 12 or 13 connected therewith; the head 26 being formed, as indicated at 30, to have another pipe or tube section 12 or 13 connected therewith; the said head 26 having a relatively wide mouth 31 for alinement with the formation 29 in any operative rotated position of said head relative to said casing, and there being mounted within said head, on a shaft 32 journaled in suitable bearings in the side walls thereof, a sheave or roller 23 over which the tape 16 is guided.

Referring particularly to Figures 5 and 6 of the drawings, it will be observed that the housing 14 carries a removable front 33 and that in this removable front is a window opening 34 which is closed by a plate 35 of glass or other suitable transparent material directly behind which a portion of one of the reaches of the tape 16 is disposed and through which said portion of said reach is visible. It will further be observed that a screw element 36 is rotatably mounted at one end in one end of the housing 14 and extends behind that portion of the reach of the tape 16 which is disposed behind the window opening 34 and is supported at its other end in a plate 37 extending transversely of the housing 14; also, that said screw element is provided exteriorly of the housing 14 with a suitable knob or handle 38 for effecting its rotation. It will further be observed that a plate 39 of sheet metal or other suitable material is disposed inwardly of or behind that portion of the tape 16 which is disposed behind the window opening 34 to afford a background to facilitate reading of the liquid level indications on the tape 16; that a nut 40 is threaded on the screw element 36; that a pair of arms 41, 41 extend from said nut toward the window opening 34 and across opposite side edges of the plate 39, whereby the nut is held against rotation but is permitted to move longitudinally along the screw element and longitudinally relative to the portion of the tape 16 which is disposed behind the window opening 34; and that carried by said arms 41, 41 and extending across the front of the portion of the tape 16 which is disposed behind the window opening 34 is an index 42 in the form of a thread of fine wire or its equivalent.

Obviously, by rotating the screw element 36 the nut 40 and, consequently, the index 42 may be adjusted longitudinally relative to the portion of the tape 16 which is disposed behind the window opening 34 to obtain a correct adjustment of the gauge for a liquid of any particular specific gravity contained in the tank 10. Obviously, too, the index 42 may readily and easily be changed whenever required without in any way disturbing any other part of the gauging equipment. Moreover, once the index 42 has been adjusted to afford, in conjunction with the indications on the tape 16, a correct indication of the level of any particular liquid which may be contained in the tank 10, the gauge may readily be read by viewing the relationship of the indications on the tape to the index 42 through the window opening 34 and as long as the specific gravity of the liquid in the tank is not changed the gauge will remain accurate due to the fact that the tubes 12 and 13 and the housing 14 are vapor tight and are completely closed to the atmosphere, being in communication only with the tank 10.

In a bottom portion of the housing 14 is an opening through which any condensate may be drained from said housing, said opening being normally closed by a plug 43.

If desired, the shaft 44 carrying the sheave 15 may be equipped with an inertia detractor as, and for the purpose, set forth in my prior Patent No. 1,937,447, the handle of such a detractor being indicated as 45 in Figure 6 of the drawings.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. In combination with a liquid storage tank, a liquid level gauge comprising a looped tape having its end portions extending downwardly into said tank, a float attached to one end of said tape, a counterbalance weight attached to the other end of said tape, a length of flexible material, of the same weight per unit of length as the tape, slidably connected at one end with the weight attached end portion of the tape and extending from said weight attached end portion of the tape substantially to the bottom of the tank and then upwardly to and connected with the other end portion of said tape, and means cooperating with said tape to indicate the level of the liquid in the tank.

2. In combination with a liquid storage tank, a liquid level gauge comprising a looped tape having its end portions extending downwardly into said tank, a float attached to one end of said tape, a counterbalance weight attached to the other end of said tape, a looped length of flexible material, of the same weight per unit of length, as said tape, slidably connected at its ends with the end portions of said tape above said float and above said weight, respectively, and extending substantially to the bottom of the tank, and means cooperating with said tape to indicate the level of the liquid in the tank.

JOHN J. TOKHEIM.